No. 662,902. Patented Dec. 4, 1900.
H. L. ARNOLD.
MOTOR VEHICLE.
(Application filed Mar. 8, 1900.)
(No Model.) 3 Sheets—Sheet I.

Witnesses:
C. W. Smith
L. L. Edwards Jr.

Inventor:
Horace L. Arnold
By his Attorney
F. H. Richards.

No. 662,902. Patented Dec. 4, 1900.
H. L. ARNOLD.
MOTOR VEHICLE.
(Application filed Mar. 8, 1900.)
(No Model.) 3 Sheets—Sheet 2.

Witnesses:
C. W. Smith
J. L. Edwards Jr.

Inventor:
Horace L. Arnold
By his Attorney
F. H. Richards.

No. 662,902. Patented Dec. 4, 1900.
H. L. ARNOLD.
MOTOR VEHICLE.
(Application filed Mar. 8, 1900.)
(No Model.) 3 Sheets—Sheet 3.

Witnesses:
C. W. Smith
J. L. Edwards Jr.

Inventor:
Horace L. Arnold
By his Attorney
F. H. Richards.

THE NORRIS PETERS CO., PHOTO-LITHO., WASHINGTON, D. C.

UNITED STATES PATENT OFFICE.

HORACE L. ARNOLD, OF NEW YORK, N. Y., ASSIGNOR TO JOHN A. HILL, OF SAME PLACE.

MOTOR-VEHICLE.

SPECIFICATION forming part of Letters Patent No. 662,902, dated December 4, 1900.

Application filed March 8, 1900. Serial No. 7,765. (No model.)

*To all whom it may concern:*

Be it known that I, HORACE L. ARNOLD, a citizen of the United States, residing in New York, (Brooklyn,) in the county of Kings and State of New York, have invented certain new and useful Improvements in Motor-Vehicles, of which the following is a specification.

This invention relates to motor-vehicles, and has for one object the provision of improved mechanism for operating such a vehicle and constructed to start or stop the same, propel it forward at one speed or another speed, or reverse the movement thereof, as desired, said mechanism being adapted to be driven by any suitable kind of gas, electric, pneumatic, or steam motor and being at all times under the complete control of the operator, whereby any of the results above set forth may readily and conveniently be accomplished.

A further object of the invention is the provision, in a vehicle of the class described, of spiral gearing for driving the same.

A further object of the invention is the provision of a shaft having a series of spiral gears coöperating with gears intermeshing therewith and connected with the axle of the vehicle to drive the same at one speed or another speed or to reverse the movement of said axle when required.

A further object of the invention is the provision, in connection with the driving mechanism, of a series of clutches by means of which any desired element of said mechanism may be brought into coöperative relation with the gearing for operating the axle carrying the traction-wheels.

A further object of the invention is the provision of improved means for actuating these clutches independently of each other, the construction being such that but one of said clutches can be oparated at a time.

A further object of the invention is the provision, in connection with improved driving mechanism, of compensating gearing to permit the rotation of the traction-wheels at different velocities without affecting the normal speed of the vehicle.

Figure 1:
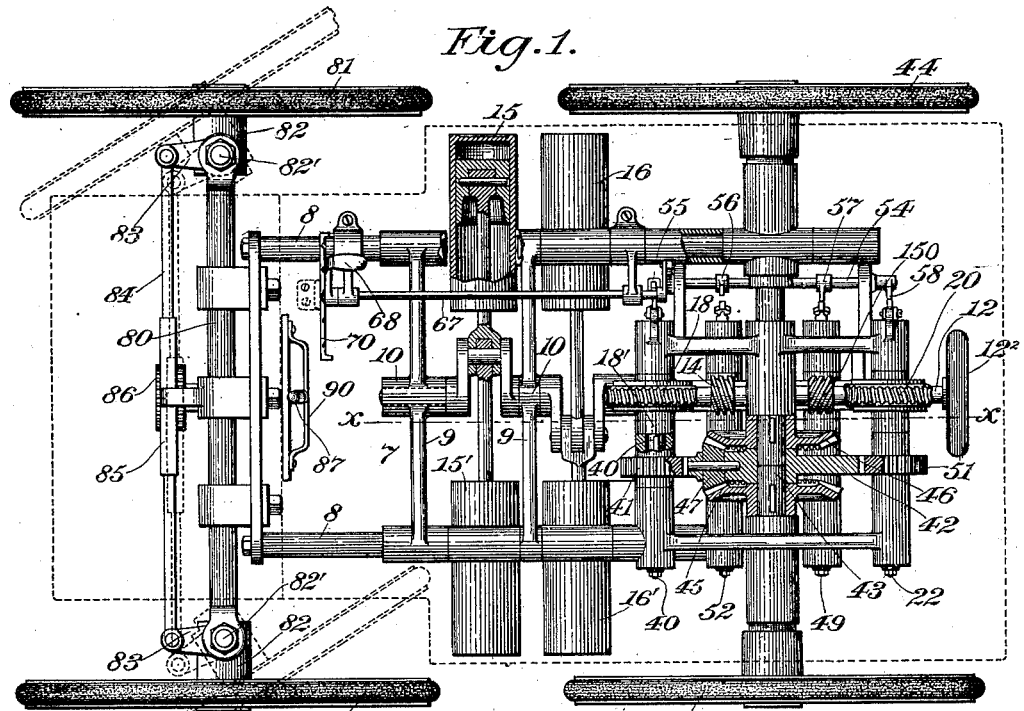
Figure 2:
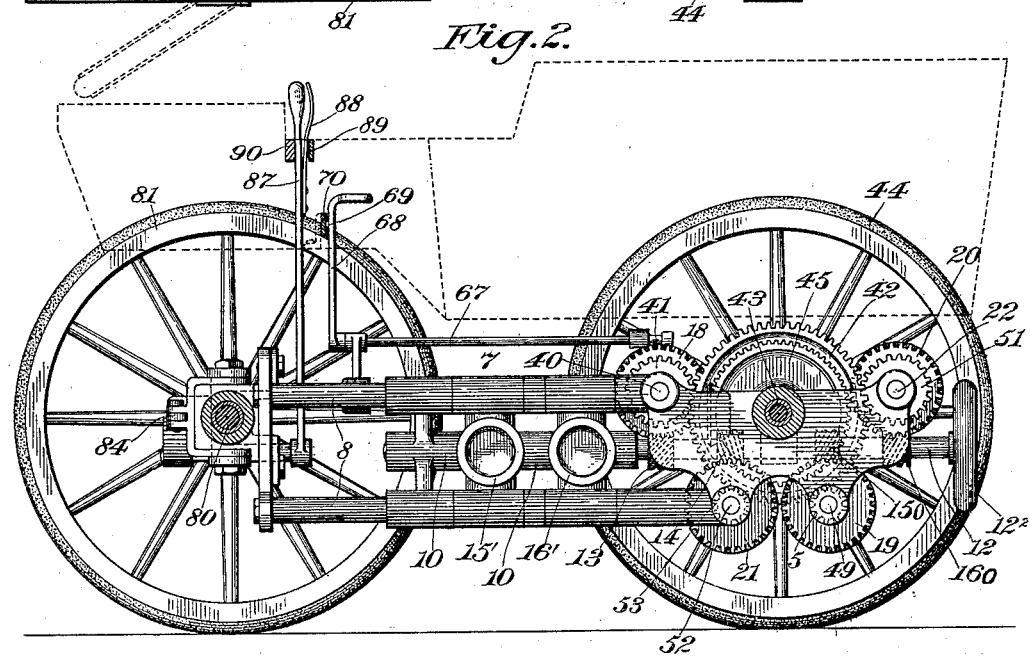
Figure 3:
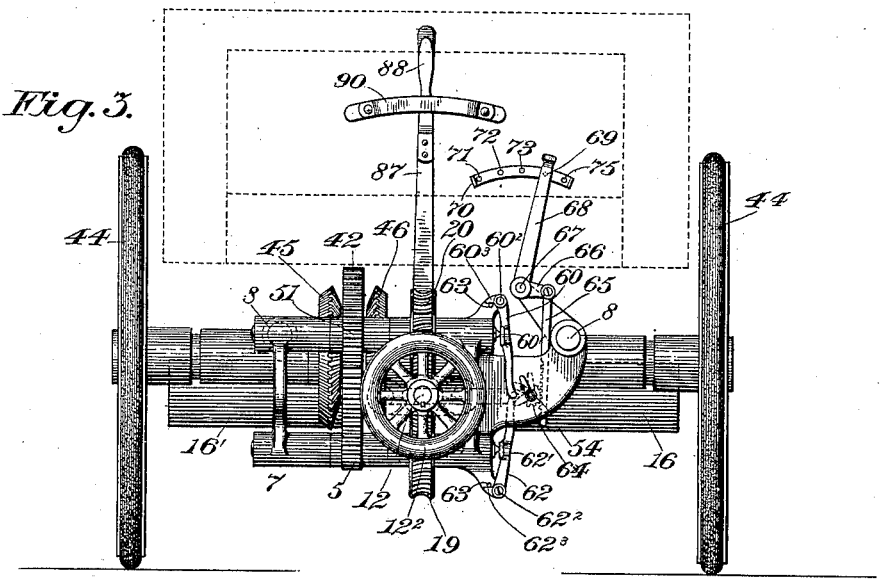
Figure 4:
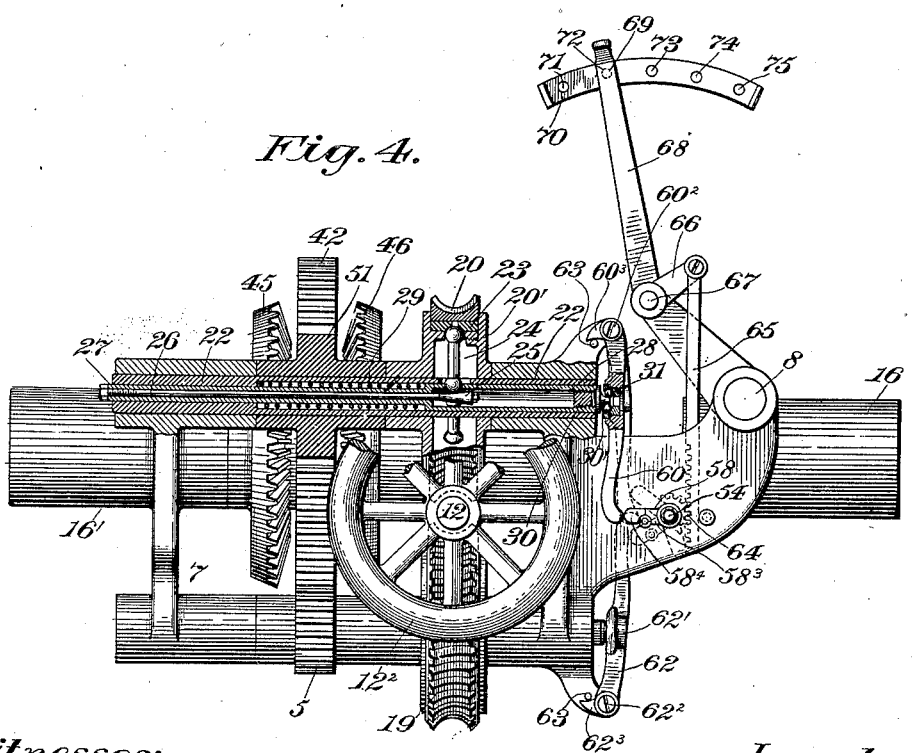
Figure 5:
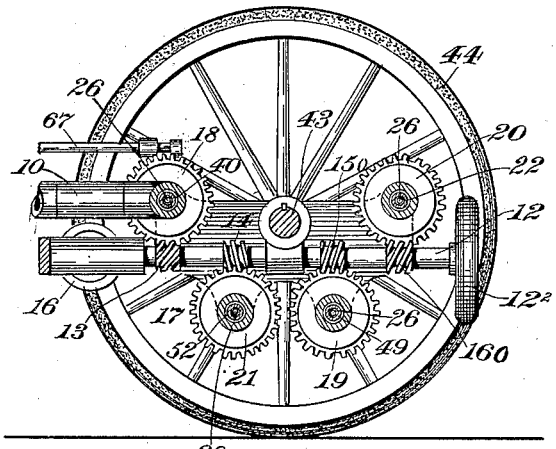
Figures 6, 7:
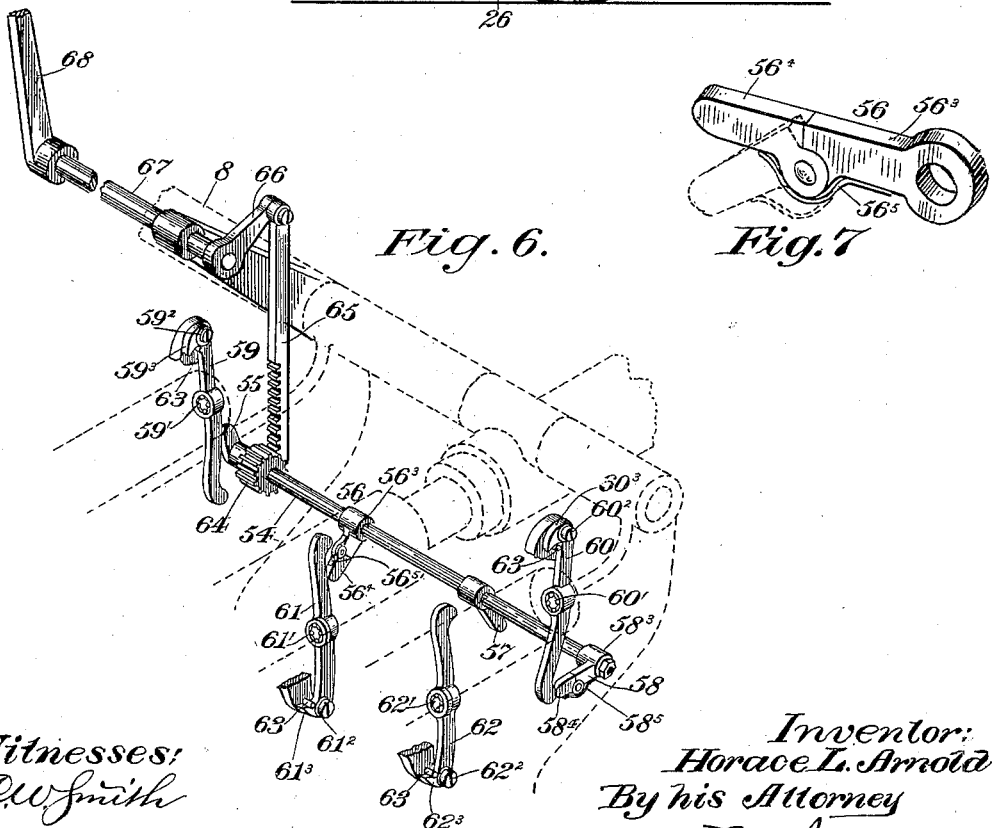

In the accompanying drawings, Figure 1 is a plan view of a motor-vehicle with my invention in place thereon, the box of the vehicle being indicated by dotted lines and the compensating gearing and one of the motor-cylinders being shown in section. Fig. 2 is a side elevation showing the shaft for driving the traction-wheels in section. Fig. 3 is a rear end elevation. Fig. 4 is a detail detached view corresponding to Fig. 3 with one of the clutch-actuating sleeves, the shaft in w⁀⁀ said sleeve is mounted, and the gearing ⁀ried by said shaft in section. Fig. 5 is a partial section on dotted line $xx$, Fig. 1. Fig. 6 is a perspective view illustrating a means for controlling the clutch-actuating devices, and Fig. 7 is a perspective view of one of the clutch-operating fingers.

Like numerals designate similar parts throughout the several views.

Referring to the drawings, the numeral 7 designates in a general way the frame of the vehicle, which may be of any desired construction, that shown comprising tubular side bars 8, connected by tubular cross-braces 9, sleeved on said side bars and having bearings 10 for the reception of the power-transmitting shaft 12, which may be operated in any desired manner and by any suitable motor.

A convenient manner of applying power to shaft 12 would be to equip the same with cranks adapted to be connected to the piston-rods of suitable motor-cylinders 15, 15', 16, and 16', mounted on the frame; but although such a construction is shown it is to be distinctly understood that the invention is not limited thereto.

Disposed at intervals along shaft 12 is a series of spiral gears, (designated by the numerals 13, 14, 150, and 160, respectively.) Four of these gears are shown; but the invention is not limited to this number, for any number of gears for obtaining the desired variations in speed may be employed, the necessary modifications being made in the mechanism coöperating with said gears. Of these gears that numbered 13 is illustrated as a worm or spiral gear, the teeth of which are of right-hand pitch or inclination, and this gear has its thread so disposed that it will drive the vehicle at its highest speed, as will be hereinafter set forth. Gears 14, 150, and 160, of shaft 12 are intended for propelling the vehicle through intermediate connections with the driving-axle thereof, hereinafter described, at slower speeds than the gear 13, said gear 150 coöperating with the intermediate mechanism to drive said vehicle at its slowest forward speed, said gear 160 coöperating with said mechanism to drive it at the usual forward speed determined upon in accordance with the law upon such subjects, and said gear 14 operating to reverse the vehicle at a slow speed.

To operate the worm-shaft by hand when necessary, it is provided with a wheel $12^2$ at its rear end.

Mounted in bearings of the frame is a suitable train of mechanism (designated in a general way by 17) connected with the axle carrying the traction-wheels and comprising a series of spiral gears 18, 19, 20, and 21, respectively, said spiral gears being clutched to their shafts when it is desired to propel the vehicle at one speed or at another speed or to reverse the movement of said vehicle.

As illustrated, spiral gear 20 is loosely carried on a hub 20', which is fixed to shaft 22, journaled in bearings of the frame, (all other spiral gears or worms being mounted in the same manner,) and connected to each of these gear-carrying hubs is a clutch of some suitable kind, that illustrated being what is known as a "divided" or "split-ring" clutch, the ring 23 of which is adapted when expanded to lock the gear to its driving-hub and to cause it to operate the shaft to which said hub is secured.

As a convenient form of clutch-operating mechanism I have illustrated a series of toggles 24 disposed in the chamber of the gear-hub and adapted to be actuated by a cone 25, detachably secured to a rod 26, adjustably connected to the stem 27 of a sleeve 28, mounted for endwise reciprocation in the shaft 22, to which the gear-hub is secured. A spiral spring 29 surrounds this stem 27 and by pressing against shoulders on the sleeve 28 and shaft 22 tends to push said sleeve outward to carry the cone 25 away from the toggles 24, and thereby release the clutch.

Threaded into sleeve 28 is a plug 30, having a hardened conical nose 30', which fits in the socket of a ball-bearing carried by each clutch-actuating lever, as will be hereinafter described. Four of these clutches are employed, (one for each shaft geared with the driving-axle,) and as they are alike in construction and mode of operation the description of one will suffice for all. Any suitable form of clutch may, however, be employed, the invention not being limited to that shown.

Recurring to the gear 18, driven by the quick-speed spiral gear or worm 13, the hub 18' of said gear is secured to shaft 40 and may be clutched to the gear and unclutched therefrom by an expansible ring, as above set forth. This shaft 40 has splined thereon a comparatively large gear 41, (shown of the "spur" kind,) and when the spiral gear is locked to said shaft said wheel will drive a large spur-gear 42, the hub of which fits over the ends of a divided shaft or axle 43, mounted in bearings projecting from the frame and carrying at each end a traction-wheel 44.

Secured to the respective sections of shaft 43 are bevel gear-wheels 45 46, respectively, and the gear 42 carries a smaller bevel-pinion 47 in mesh with said wheels, this arrangement constituting "compensating" gearing for permitting one of the sections of shaft 43 to travel faster than the other—for instance, when the traction-wheels are rounding curves—without affecting the speed at which the vehicle is being driven.

Worm or spiral gear 160 for driving the vehicle at the usual moderate forward speed is in mesh with gear 20, above described, carried by shaft 22, journaled in bearings in the upper part of the frame, and this shaft is driven by the clutch instrumentalities illustrated in Fig. 4, and said shaft also carries a pinion 51 in mesh with the large gear 42 on shaft 43, whereby when said gear 20 is clutched to its hub gear 42 will be driven.

Worm or spiral gear 150 for propelling the vehicle forward at its slowest speed is in mesh with worm-gear 19, the shaft 49 of said gear 19 carrying a small pinion 5, intermeshed with gear 42, and worm or spiral gear 14, which is, as above stated, of reverse pitch from that of the other gears, is in mesh with gear 21 on a shaft 52, journaled in bearings on the under side of the frame, and said shaft carries a pinion 53 in engagement with gear 42 and adapted when the clutch of shaft 52 is manipulated to lock the worm-gear 21 thereto to drive the shaft 43 in a reverse direction and propel the vehicle backward at a slow speed.

It will be understood that each of the shafts 22, 40, 49, and 52 is equipped with clutch-actuating devices like those shown in Fig. 4, and means will now be described for operating any of said clutch-actuating devices desired with no possibility of setting more than one clutch at a time.

Journaled in bearings preferably secured to one of the side bars 8 of the frame, although it may be otherwise mounted, is a shaft 54, having attached at intervals thereto a series of fingers 55, 56, 57, and 58, respectively, and, as will be observed, (see Fig. 6,) each of these fingers projects from said shaft in a different direction—in the construction shown finger 55 projecting upward at an angle nearly approaching a right angle, finger 56 downward in one direction at an angle of about thirty-five degrees, finger 57 downward at about the same angle as finger 56, but in the opposite direction thereto, and finger 58 at right angles to said shaft. This arrangement may be variously modified without departure from my invention, and the fingers may be set at one angle or another angle, provided they accomplish the desired result.

Coöperating with the fingers 55, 56, 57, and 58 and with the clutch mechanisms of the worm-carrying shafts are levers 59, 60, 61, and 62, each having a ball-bearing 59', 60', 61', and 62', two of which levers, 59 and 60, are pivoted to the frame at 59² and 60² and project downward, their lower ends being in position to be actuated by the fingers 55 and 58 of the shaft 54, and two of which, 61 and 62, are pivoted to the frame at 61² and 62², respectively, and project in a vertical plane, so that their free ends may be engaged by the fingers 56 and 57 of said shaft 54, and here it may be stated that each of the fingers 56 and 58 is composed of sections, one, 56³ and 58³, being secured to the shaft, and the other, 56⁴ and 58⁴, being connected to the former in such a manner that it will yield in one direction and be inflexible in the other direction. In the construction illustrated this result is secured by pivoting each section 56⁴ 58⁴ to the other section in such a manner that it may yield against the stress of a spring 56⁵ 58⁵ when the shaft 54 is turned one way, and consequently will pass by without actuating the one of the levers 60 61 with which it coöperates, and will be held rigid to actuate its lever when the shaft 54 is rocked in the opposite direction. Each lever 59, 60, 61, and 62 is equipped with a nose 59³, 60³, 61³, and 62³, which comes into contact with a stop 63 and limits the movements of said lever.

Carried by shaft 54 is a pinion 64 in engagement with a rack 65, which is actuated by a crank 66, carried by a shaft 67, pivoted in brackets projecting from one of the side bars 8 of the frame, and to this shaft is secured a hand-lever 68, carrying a retaining-pin 69 for coöperating with a quadrant 70, secured to the frame and having a series of holes 71, 72, 73, 74, and 75 for the reception of pin 69, as will be hereinafter described. (See Fig. 4.)

Mounted in bearings at the forward end of the frame is the usual axle 80, to which the steering-wheels 81 may be secured in any well-known way. As shown, the hubs 82 of said wheels are pivoted to the axle at 82' in such a manner that the wheels may be turned to the angle desired, and each hub has a crank 83, said cranks being connected by a rod 84, having a rack 85 on its under side in engagement with a pinion 86, the shaft of which carries a lever 87, equipped with a spring 88, having a projection 89, adapted to be engaged with any one of a series of recesses in a quadrant 90, attached to the frame.

It will be observed that the worm-shaft 12 is located at right angles to the traction-axle 43; that the quick-speed worm 13 is in engagement with worm-wheel 18 of shaft 40; that the slowest forward-speed worm 150 is intermeshed with worm-gear 19 of shaft 49; that the moderate-speed worm 160 coacts with worm-wheel 20 on shaft 22; that the reversing slow-speed worm 14 is in engagement with worm-wheel 21 on shaft 52; that each of the shafts 22, 40, 49, and 53 carries a pinion in engagement with the large gear 42 on the traction-axle, and that the shaft 12 is constantly driven by the motor, thereby causing all of the worm-gears 18, 19, 20, and 21 to be operated, each of said gears, with the exception of the one clutched to its shaft, rotating loosely on its supporting-hub.

Referring to Figs. 4 and 6, it will be seen that lever 68 has been thrown from the "stop-notch" 74 of quadrant 70 to the second or moderate "forward-speed" notch 72 of said quadrant, thereby through the connections described rocking shaft 54 and its finger 58 to actuate lever 60 to push back the sleeve 28 and its connected cone 25 against the stress of spring 29 and cause the toggles 24 to expand the divided ring 23, and thus lock the worm-wheel 20 to its hub, drive the shaft 22, and impart, through pinion 51, gear 42, and compensating gears 45, 46, and 47, rotation to the shaft 43 to cause the vehicle to be driven at a moderate forward speed. As appears from Fig. 6, when the shaft 54 is rocked to the position just described and the lever 68 is held by its pin in notch or recess 72 of the quadrant the finger 58 will be thrown to a position at right angles to the shaft 54 and will retain lever 60 and its connected clutch-operating devices in the positions shown while the vehicle is being propelled at the speed described. Should it be desired, however, to drive the vehicle at its quickest forward speed, lever 68 will be shifted to the "fast-speed" notch 71, and this will cause shaft 54 to be further rocked in the same direction to force finger 55 against lever 59, throw the clutch-actuating device of shaft 40 into action, and, through the pinion 41 and gear 42, drive the traction-wheel shaft at its highest speed. When it is desired to drive the vehicle at its slowest forward speed, lever 68 is first shifted to the right to the stop-notch 74, which releases the quick-speed gearing, and is then moved to the left until its pin enters the "slow-speed" notch 73 of quadrant 70, thereby rocking shaft 54 and causing its finger 57 to force forward lever 62, and by the instrumentalities described set the clutch in shaft 49, and through its worm-wheel 19 and small pinion 5 drive gear 42 and shaft 43 in the manner stated. If it should be desired to reverse the movement of the vehicle, lever 68 is thrown to the right until its pin enters the "reversing-notch" 75 of quadrant 70, thereby through shaft 54 and finger 57 operating the lever 61 and causing the clutch in shaft 52 to be set, and thereby through gear 21, in engagement with the reverse-pitch worm 14 and pinion 53, splined to shaft 52, driving the gear 42 in a direction to propel the vehicle backward. Should it be desired to stop the vehicle, the lever 68 is thrown to the stop-notch 74, and in this position all of the clutches on the various shafts are loose, and the worm-gears on said shaft idly rotate until the motor ceases to operate.

While the arrangement, sizes, and proportions of gears for propelling the vehicle in a forward direction at different speeds or in a reverse direction at a low speed may be widely varied and still be within the purview of my invention, I prefer to proportion the gearing as follows: The first worm or spiral gear 13, which is nearest the motor, has a thread of double the pitch or inclination of the second or reverse-pitch worm 14 and of the third and fourth worms 150 and 160, and therefore imparts twice the speed of the other three to the gear 18, and through the gears 41 and 42 and the compensating gear drives the traction-wheel axle at the highest velocity in a forward direction fixed upon as desirable. The fourth worm-gear 160 drives worm-wheel 20, and through pinion 51, of the same diameter as pinion 41, actuates spur-gear 42, and through the connections described drives the vehicle forward at one-half the speed of the first worm. The third worm-gear 150, meshing with worm-wheel 19, drives the shaft 49 and its small pinion 5, and the latter, through gear 42 and the other connections set forth, drives the vehicle at one-fourth the speed of the first worm-gear 13, and the second worm 14, of reverse pitch, engaging with worm-gear 21 of shaft 52, through pinion 53, of the same size as pinion 5 on said shaft, and the intermediate gearing connecting said pinion with axle 43, propels the vehicle in a reverse direction at one-fourth the speed of said first worm 13. It will therefore be seen that by this combination of four worms of the same diameter, four worm-gears of the same diameter, and four pinions, two of which are of one diameter and the other two of half that diameter, I am enabled to drive the vehicle at three different speeds in a forward direction and at its slowest speed in a reverse direction, and of these speeds the two slower are in opposite directions, one of them driving the machine forward and the other backward, and the two quicker are in a forward direction, the machine being capable of being driven forward either at double the slowest rate of speed or at four times the slowest velocity with the gearing proportioned as described.

Many changes may be made in the form, proportions, and location of the various parts, and any suitable clutch mechanism and steering-gear may be substituted for the construction shown, without departing from my invention.

No claim is made to the clutch mechanism shown and described, for it constitutes the subject-matter of my application filed February 21, 1900, Serial No. 6,008.

Having described my invention, I claim—

1. A motor-vehicle comprising a motor; a set of spiral driving-gears actuated by said motor; a set of spiral driven gears in mesh with said spiral driving-gears; shafts upon which the spiral driven gears are loosely mounted; clutches for locking any desired spiral driven gear to its shaft; means for actuating said clutches; and gearing for connecting the spiral driven gears with an axle of the vehicle.

2. In a motor-vehicle, the combination, with a motor, of a shaft driven by said motor and carrying a series of spiral gears; a series of shafts; a series of loosely-mounted spiral gears carried by said shafts; a series of devices for locking the loosely-mounted gears individually to their shafts; an axle; and gearing connecting said axle with said shafts.

3. In a motor-vehicle, the combination, with a motor, of a shaft driven by said motor; a series of spiral gears located at intervals on said shaft, some of said gears having threads of different inclination from the others; a series of shafts; a series of loosely-mounted spiral gears carried by said shafts; a series of clutches for locking the loosely-mounted spiral gears individually to their shafts; an axle; and gearing connecting said axle and said shafts.

4. In a motor-vehicle, the combination, with a motor, of a shaft driven thereby; a series of spiral gears located at intervals on said shaft; a series of shafts; a series of spiral gears loosely mounted on said shafts; a series of clutches for connecting at will the spiral gears to their shafts; gearing for connecting said shafts and an axle of the vehicle; a series of levers for operating the clutches; and means for actuating said levers.

5. A motor-vehicle comprising a motor; a traction-wheel axle; spiral gears for driving said axle at different speeds; a series of shafts; spiral gears loosely mounted on said shafts; a series of clutches for connecting the loosely-mounted gears with their shafts; a series of pivoted levers for actuating the clutches; and means for operating the levers.

6. The combination, with a shaft carrying spiral gears one of which is of reverse pitch to that of the other, of a motor for driving said shaft; a series of spiral gears intermeshed with the gears of said motor-driven shaft; shafts on which said spiral gears are loosely mounted; means for coupling at will any of said spiral gears to its shaft; pinions carried by each of said shafts; a driving-axle; and gearing mounted on said axle and in engagement with said pinions.

7. The combination, with a motor, of a shaft having spiral gears driven by said motor; shafts having loosely-mounted spiral gears located at one side of the motor-shaft; shafts having loosely-mounted spiral gears located at the other side of said motor-shaft; clutches in all of said shafts; means for actuating said clutches to connect the loosely-mounted spiral gear desired to its shaft; a driving-axle; and gearing for operating said axle and in engagement with the pinions carried by the shafts.

8. In a motor-vehicle, the combination, with a series of spiral gears geared to the driving-axle of said vehicle, of a series of clutches connecting said gears with their shafts, and means for actuating said clutches, the construction being such that but one clutch can be actuated at a time.

9. The combination, with a driving-shaft having a series of spiral gears located at intervals thereon, of a series of shafts; a series of loosely-mounted spiral gears carried by said shafts; a series of clutches; gearing connecting said spiral gears with an axle; a series of pivoted levers for actuating said clutches; a shaft having fingers for operating said levers; and means for actuating said shaft.

10. The combination, with a driving-shaft having a series of spiral gears one being of reverse pitch to that of another, of a series of loosely-mounted spiral gears constantly in engagement with the spiral gears of the driving-shaft; a series of shafts by which the loosely-mounted spiral gears are carried; means for locking at will any of said gears to its shaft; a series of pinions, one secured to each shaft; an axle; and gearing for driving said axle and in engagement with the pinions of said shafts.

11. The combination, with an axle, of gearing carried by said axle; a motor; a shaft driven by the motor and carrying a series of spiral gears; a series of shafts some located on one side and others on the opposite side of the motor-driven shaft; a series of spiral gears loosely mounted on said shafts; clutches for connecting at will any of said spiral gears to its shaft; levers for actuating said clutches; a shaft having fingers so disposed thereon that but one clutch-actuating lever can be operated at a time; and means for actuating said shaft.

12. The combination, with a series of clutches, of means for actuating said clutches, and a shaft having a series of fingers disposed at different angles to its axis for operating the clutch-actuating means, some of said fingers being yielding in one direction and rigid in the other direction.

13. The combination, with a series of clutches, of pivoted levers for actuating said clutches, and a shaft having a series of fingers disposed at different angles to its axis for operating said levers, some of said fingers being yielding in one direction and rigid in the other direction.

14. The combination, with a series of shafts, of gears loosely mounted on said shafts; clutches for coupling said gears to their shafts; a shaft having a series of fingers, some of which are yielding in one direction and rigid in the other; and means for actuating said shaft.

15. The combination, with a series of shafts, of gears loosely mounted on said shafts; clutches for coupling said gears to their shafts; pinions fixed to said shafts; an axle; gearing driven by said pinions; means for actuating the clutches; and a shaft having a series of fingers disposed at different angles to its axis for operating the clutch-actuating means.

16. The combination, with a series of shafts, of gears loosely mounted on said shafts; clutches for coupling said gears to their shafts; a series of pinions some of which are of different diameter from others, secured to said shafts; means for actuating said clutches; a shaft having a series of fingers disposed at different angles to its axis for operating the clutch-actuating means; and a lever and connections for actuating said shaft.

17. The combination, with a motor, of a shaft driven thereby and carrying a series of spiral gears one of which has a thread of greater inclination than the threads of the others; a series of shafts; spiral gears loosely mounted on said shafts and meshing with the spiral gears on the motor-driven shaft; friction-clutches for locking any of said gears to its shaft when desired; pinions splined to said shafts; pivoted levers for actuating said clutches; a shaft carrying a series of fingers, each disposed at a different angle to its axis, for operating the clutch-actuating levers; rack-and-pinion mechanism for actuating said finger-carrying shaft; and gearing connecting the pinions on the shafts with the driving-axle of a vehicle.

18. The combination, with a motor, of a shaft having a quick-speed worm or spiral gear and a series of slower-speed worms or spiral gears located at intervals thereon; spiral gears or worm-wheels in mesh with the worms on the motor-driven shaft; a series of shafts to which said spiral gears or worm-wheels are loosely connected; clutches for locking said gears to their shafts; means for actuating the clutches; and gearing connecting said shafts with the driving-axle of a vehicle.

19. The combination, with an axle, of a train of gearing for driving said axle at different speeds; a series of clutches for coupling certain elements of said train to their shafts; means for separately actuating said clutches; a shaft carrying a series of fingers disposed at various angles thereto; and means for operating said shaft.

20. The combination, with the driving-axle of a vehicle, of a motor; a train of gearing actuated by the motor and constructed to drive said axle at different speeds; a series of clutches for coupling certain elements of said train to their shafts; means for actuating said clutches each at a different time; a shaft carrying a series of fingers disposed at various angles to its axis; and means for actuating said shaft to set the desired clutch.

21. The combination, with the sectional driving-axle of a vehicle, of compensating gearing connected to said axle; a series of shafts carrying pinions each in mesh with a gear carried by said driving-axle; a series of loosely-mounted spiral gears; toggles located in the hubs of said gears; a divided ring actuated by each of said toggles and adapted when expanded to clutch a spiral gear to its hub; means for actuating the toggles; and means for driving the spiral gears.

22. In a motor-vehicle, the combination, with a motor, of a shaft driven by said motor; a series of spiral gears located at intervals on said shaft; a series of hollow shafts located above and below the motor-shaft; a series of spiral gears loosely mounted on hubs secured to said shafts; a series of toggles; a series of expansible rings located between the spiral gears and their hubs; a sleeve carrying a cone mounted in each of said shafts; pivoted levers for actuating said sleeves; a shaft having fingers disposed at various angles to its axis; a pinion on said shaft; a rack in engagement with said pinion; and a lever connected to said rack.

23. In a motor-vehicle, the combination, with a motor, of a shaft carrying a quick-speed spiral gear; two slow-speed spiral gears; a slow-speed spiral gear of reverse pitch from that of the other gears; a series of shafts journaled in the framework of the vehicle; a series of spiral gears constantly in mesh with the spiral gears of the motor-shaft and loosely mounted on their shafts; means for clutching said spiral gears one at a time to their shafts; a series of pinions carried by the shafts; and gearing connecting said pinions with the driving-axle of the vehicle.

24. In a motor-vehicle, the combination, with the driving-axle thereof, of gearing connected to said axle; a series of shafts carrying pinions intermeshed with said gearing; a series of spiral gears loosely mounted on said shafts; a series of clutches for coupling any one of said spiral gears to its shaft; a rock-shaft carrying a series of fingers disposed at various angles to its axis; means for actuating said rock-shaft; and a lever under control of the operator, for operating the rock-shaft-actuating means.

HORACE L. ARNOLD.

Witnesses:
WM. H. BLODGETT,
C. S. WEED.